United States Patent [19]

Müller

[11] 4,334,896

[45] Jun. 15, 1982

[54] FILTER REPLACEMENT PROCESS AND APPARATUS

[75] Inventor: Georges Müller, Dijon, France

[73] Assignee: Commissariat à l'Energie Atomique, Paris, France

[21] Appl. No.: 287,359

[22] Filed: Jul. 27, 1981

[30] Foreign Application Priority Data

Aug. 6, 1980 [FR] France .................. 80 17376

[51] Int. Cl.³ ........................... B01D 46/00
[52] U.S. Cl. ........................... 55/96; 55/422; 55/478; 55/497; 55/502; 55/504; 55/DIG. 9
[58] Field of Search .................. 55/96–97, 55/478, 497, 484, 504, DIG. 9, 422, 502

[56] References Cited

U.S. PATENT DOCUMENTS

| | | | |
|---|---|---|---|
| 3,354,616 | 11/1967 | Lucas | 55/422 X |
| 3,402,530 | 9/1968 | Agnon | 55/478 X |
| 4,193,844 | 3/1980 | Neumann et al. | 55/504 X |
| 4,247,315 | 1/1981 | Neumann | 55/484 X |

FOREIGN PATENT DOCUMENTS 2327713 5/1977 France .
2338735 8/1977 France .

*Primary Examiner*—Kathleen J. Prunner
*Attorney, Agent, or Firm*—Pearne, Gordon, Sessions, McCoy & Granger

[57] ABSTRACT

The invention relates to a process and an apparatus for the replacement of a filter placed between the contaminated area and the uncontaminated area of a vessel.

The filter is surrounded by a tightly sealed bag as from the uncontaminated area and this bag is sealingly fixed to the outer periphery of a supporting frame. The filter is removed from the supporting frame and placed on the bottom of the tightly sealed bag, which is welded at two spaced points. The bag is then cut between the two welds so as to obtain a tight diaphragm separating the two areas of the vessel. A supplementary supporting frame is then sealingly fixed to the supporting frame and a new filter is fitted from the uncontaminated area of the vessel. The tight diaphragm is then removed from the contaminated area.

6 Claims, 8 Drawing Figures

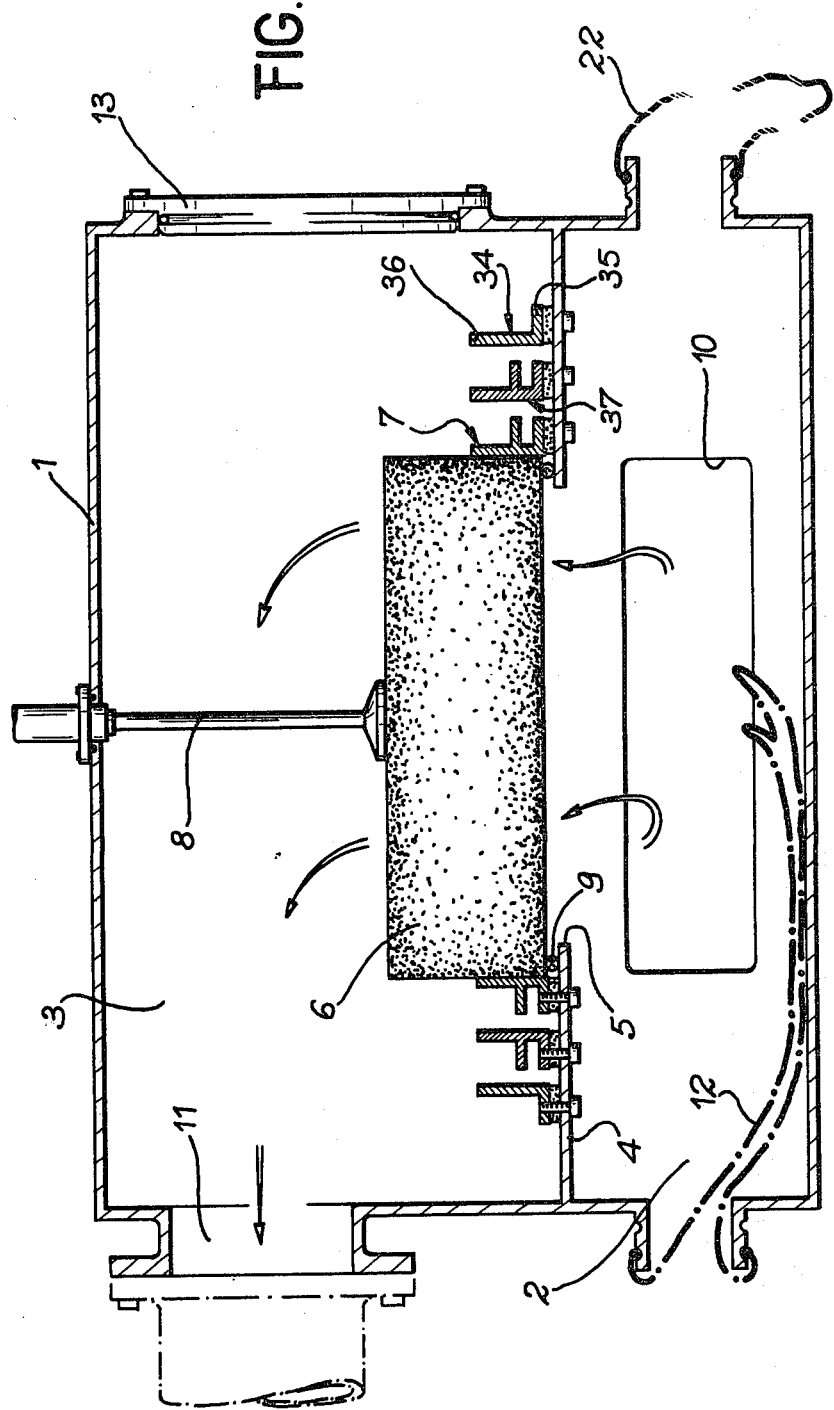

FILTER REPLACEMENT PROCESS AND APPARATUS

The present invention relates to the replacement of a filter placed in a vessel. More specifically, it relates to a process and to an apparatus permitting the replacement of a filter placed between the contaminated area and the uncontaminated area of a vessel, without there being any break in the confinement of the contaminated area.

Numerous ventilation installations exist in the industry which serve to purify atmospheres contaminated either by radioactive dust or by particularly toxic substances.

The main problem caused by this type of installation is the replacement of filters without there being any contamination risk. However, in all the systems used in existing installations, sealing is not permanently maintained during filter changes, which involves contamination risks.

The present invention relates to an apparatus and a process which obviate this disadvantage by permitting the replacement of filters without any break in the confinement of the contaminated area.

According to the main feature of the process according to the invention, the filter is placed in a vessel having at least one contaminated area and at least one uncontaminated area separated by a plugging sheet having at least one opening in front of which, from the side of the uncontaminated area, is fixed the filter guided by means of a supporting frame and sealingly applied either directly to the plugging sheet or to a supplementary supporting frame, the latter being itself sealingly fixed to the plugging sheet about the opening of the latter and on the side of the uncontaminated area, wherein this process consists of the following stages: the filter is surrounded by a tightly sealed bag made from a flexible material as from the uncontaminated area and this bag is sealingly fixed to the outer periphery of the supporting frame, the filter is removed from the supporting frame and placed on the bottom of the tightly sealed bag, the bag is welded at two points and cut between the two welds so as to obtain on the one hand a hermetically sealed bag containing the filter and on the other a tight diaphragm separating the contaminated and uncontaminated areas of the vessel, the filter is then removed from the vessel as from the uncontaminated area and a supplementary supporting frame is sealingly fixed to the supporting frame, the new filter is fitted from the uncontaminated area of the vessel, being sealingly applied to the supplementary supporting frame which will serve the same function as the supporting frame during the next replacement and the tight diaphragm is removed from the contaminated area of the vessel.

The present invention also relates to an apparatus for performing this process.

According to the main feature of this apparatus the latter comprises at least one base supporting frame having at least one flange making it possible to sealingly fix it to the plugging sheet from the side of the uncontaminated area of the vessel around the opening of said plugging sheet, at least one flange permitting the fixing of the supplementary supporting frame and at least one flange permitting the guidance of the filter, said apparatus also comprising at least one set of supplementary supporting frames, each having at least one flange making it possible to sealingly fix it to the base supporting frame or to another supplementary supporting frame, at least one flange permitting the tight fixing of another supplementary supporting frame, at least one flange making it possible to guide the new filter and at least one flange to which the new filter can be tightly applied.

This process and this apparatus make it possible to replace the filter without any break in the confinement of the contaminated area as a result of the tight diaphragm separating the two areas during the operation.

The invention is described in greater detail hereinafter relative to non-limitative embodiments and with reference to the attached drawings, wherein:

FIG. 1 is a diagrammatic sectional plan view showing the filter placed between the contaminated area and the uncontaminated area of the vessel.

Figure 2A:
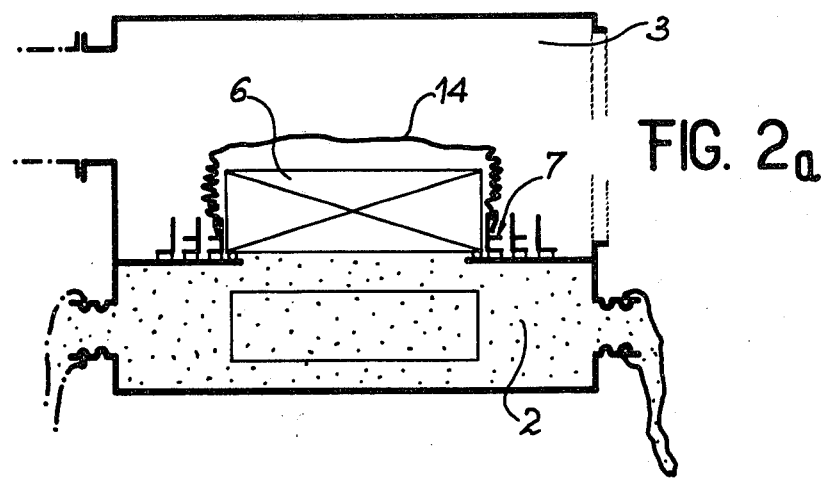
FIGS. 2a to 2e are diagrammatic sectional plan views showing the different stages of the process according to the invention.

In FIG. 1, it is possible to see vessel 1, which comprises a contaminated area 2 and an uncontaminated area 3 separated by a plugging sheet 4. The latter has an opening 5 in front of which the filter 6 is placed from the side of the uncontaminated area. The filter is positioned by means of a supporting frame 7 fixed from the side of the uncontaminated area to the plugging sheet and all around opening 5. It is also possible to see a plunger 8 making it possible to sealingly apply the filter to plugging sheet 4, sealing being ensured by a joint 9 which can be integrated into filter 6 during its manufacture.

The contaminated air enters the vessel through an opening 10, passes from the contaminated area into the uncontaminated area across filter 6 and is discharged by an outlet 11. One or more gloves 12 of the type used in dry or glove boxes make it possible to work in the contaminated area of the vessel, whilst an inspection or access door 13 gives access to filter 6 from the side of the uncontaminated area 3.

FIGS. 2a to 2e illustrate the different stages of the replacement process according to the invention.

A replacement operation according to the process of the invention takes place in the following way. From the uncontaminated area 3, filter 6 is surrounded by a flexible tight bag 14, e.g. a vinyl bag (FIG. 2a). It is obvious that for completely surrounding the filter, plunger 8 must be withdrawn for a short time. In order that there is no break in the seal, it is either possible to manually hold the filter during the withdrawal of the plunger, or to use two plungers which are withdrawn successively.

Figure 2B:
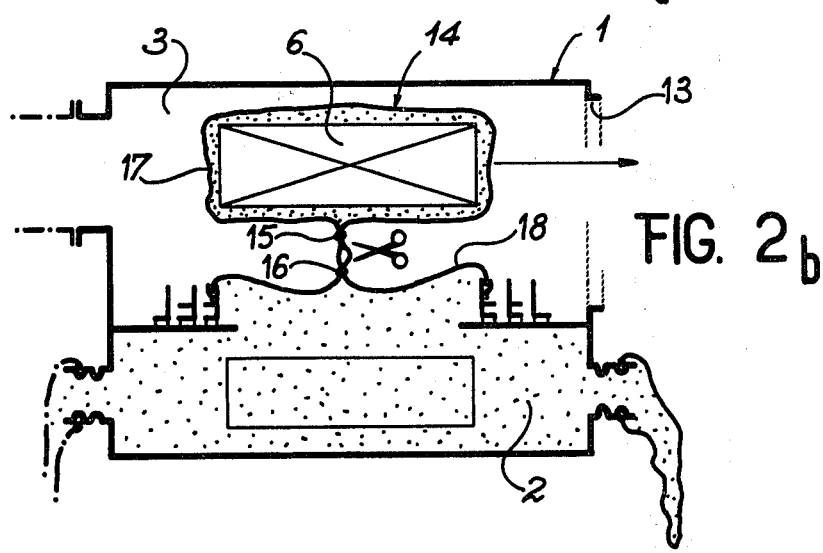

The tight bag 14 is then fixed to the outer periphery of supporting frame 7 by means of an adhesive tape or any other means ensuring the sealing. The filter 6 is then removed and placed on the bottom of bag 14. The latter is welded at two points 15, 16 and cut between said two welds 15, 16 (FIG. 2b). Thus, on the one hand a hermetically sealed bag 17 is obtained containing filter 6 and on the other a tight diaphragm 18 separating the contaminated area 2 and uncontaminated area 3 of the vessel.

Figure 2C:
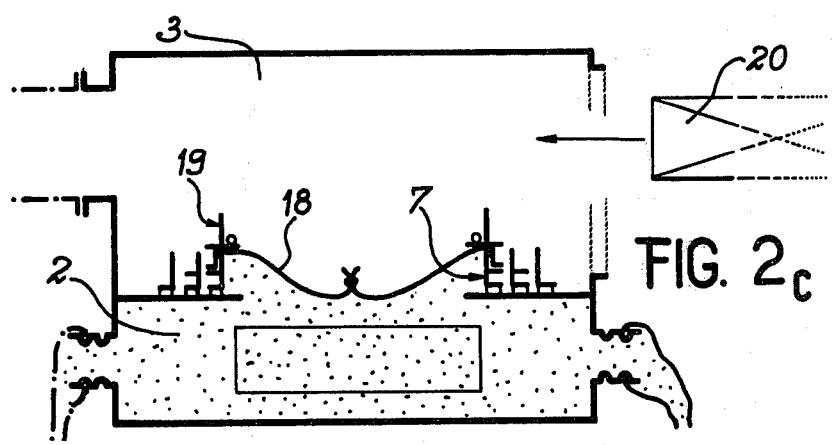

The filter is then removed through the inspection door 3 and a supplementary supporting frame 19 is sealingly fixed to supporting frame 7, whilst diaphragm 18 is still in place (FIG. 2c).

Figure 2D:
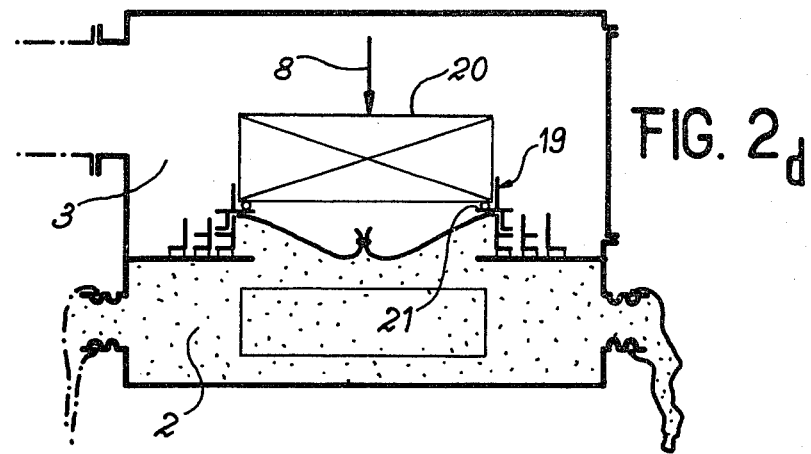

From the uncontaminated area 3, a new filter 20 identical to filter 6 is introduced and by means of plunger 8 it is sealingly applied to the flange 21 of supplementary frame 19 provided for this purpose (FIG. 2d).

Figure 2E:
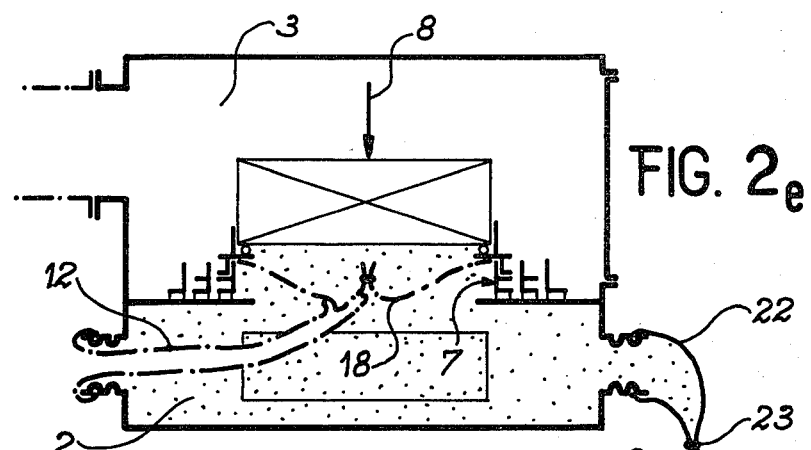

Finally, by means of glove 12, diaphragm 18 is torn from supporting frame 7 as from the contaminated area 2 and removed, e.g. by forcing it to the bottom of a vinyl sleeve 22 which is welded at two locations 23, 24 and cut between the two welds 23, 24 (FIG. 2e).

When in turn filter 20 has to be replaced, the aforementioned cycle is recommenced, filter 20 serving the same function as filter 6 and supplementary supporting frame 19 fulfilling the function of supporting frame 7.

Figures 3A, 3B:
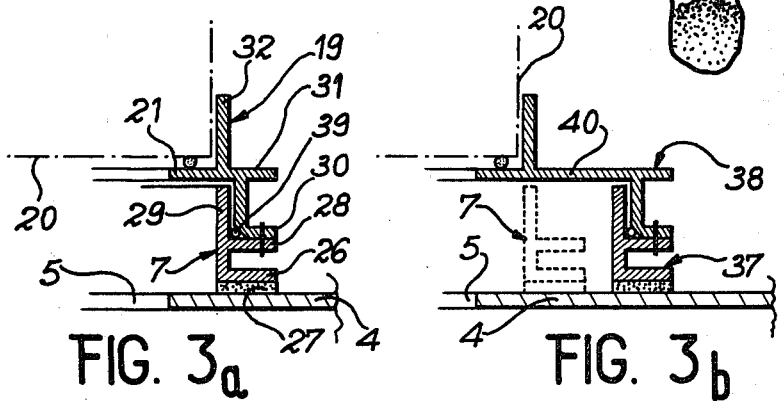
FIGS. 3a and 3b are sectional diagrammatic views showing the profile of the base supporting frames and the supplementary supporting frames used in the process according to the invention.

FIG. 3a shows in greater detail the profile of the base supporting frame 7, which firstly has a flange 26 permitting its tight fixing to the plugging sheet 4, e.g. by means of a silastene joint 27.

Frame 7 also comprises a flange 28 permitting the fixing of the first supplementary supporting frame 19, e.g. by bolting and a flange 29 permitting the guidance of the first filter which is in turn directly applied to the plugging sheet 4.

In FIG. 3a it is also possible to see the profile of a supplementary supporting frame 19. The latter firstly has a flange 30 permitting its fixture in a sealing manner to flange 28 of the base supporting frame 7, the sealing being ensured by a silastene joint 39, and a flange 31 permitting the fixing of flange 30 of another supplementary supporting frame, sealing being once again ensured by a silastene joint. The supplementary supporting frame 19 also has a flange 32 for guiding the new filter 20 and a flange 21 to which the filter 20 is sealingly applied.

As a further supplementary supporting frame 19 is added whenever a filter is replaced, it is clear that after a certain number of replacements the stack of frames will reach a maximum height and it will be necessary to remove them all.

The frame removal process is based on the same principle as for the filter replacement process. To this end, the final filter is removed after placing it in a hermetically sealed bag, in accordance with the first two stages of the replacement process according to the invention, then with diaphragm 18 in place, all the supporting frames are surrounded by a tight bag from a flexible material which is sealingly fixed to the outer periphery of a removal frame 34, itself sealingly fixed to the plugging sheet 4 from the side of the uncontaminated area 3 and externally of supporting frame 7 (FIG. 1). The base supporting frame 7 is then disengaged from plugging sheet 4 and the stack of frames is removed in the same way as the used or spent filters by placing them at the bottom of the tight bag which is welded at two points.

The vessel is then decontaminated and the base supporting frame 7 replaced.

In FIG. 1, it is possible to see that removal frame 34 has a flange 35 permitting its tightly sealed fixing to the plugging sheet (e.g. with a silastene joint) and a flange 36 to which has been sealingly fixed the bag used for removing the stack of supporting frames.

In the case of a vessel where frequent replacements occur, it may be advantageous to save time by making the decontamination operations less frequent. To this end, the vessel is equipped from the outset with two base supporting frames 7 and 37, the latter being fixed externally to frame 7. Frame 7 is used for a first series of filters and then when it is necessary to remove the corresponding frame stack, it is the second base supporting frame 37 which will be used as the removal frame. After removing the first stack of supporting frames and with the two areas of the vessel separated by a tight diaphragm, a supplementary supporting frame 38 is fixed to the base supporting frame 37 (FIG. 3b). However, as the latter is displaced with respect to frame 7, it is necessary to use supplementary supporting frames 38 with dimensions different slightly from those of supporting frames 19 to be able to use the same filters in the vessel. To this end, frames 38 must have a sufficiently wide flange 40 for the two following conditions to be fulfilled: possibility of fixing frame 38 to frame 7 and for filter 20 to be positioned in front of opening 5 of plugging sheet 4.

It is obvious that when it is necessary to remove the stacks of supporting frames 37, 38 removal frame 34 is again used and it is then necessary to decontaminate the vessel. However, the fact of using two base supporting frames makes it possible to economise on one decontamination operation out of every two (optionally an even larger number of base supporting frames could be provided).

The process of the invention offers numerous advantages. It permits the replacement of filters without any break in the confinement of the contaminated area, so that there is no risk for the operator. In addition, it can easily be performed. Finally, if the vessel dimensions are carefully chosen, a large number of replacements can be carried out without it being necessary to decontaminate the vessel, the decontamination operations taking place at even longer intervals when several base supporting frames and several sets of supplementary supporting frames are used.

It is obvious that the invention is not limited to the embodiments described and represented herein and numerous variants are possible thereto without passing beyond the scope of the invention.

For example, it is possible to envisage vessels having several contaminated and uncontaminated areas separated by filters or several filters placed on the same plugging sheet. Furthermore, if the supporting frames are to be able to fulfil all the functions referred to hereinbefore, they can have random shapes and dimensions so as to be adaptable to any filter type and in particular can be parallelepipedic or cylindrical.

I claim:

1. A process for the replacement of a filter placed in a vessel having at least one contaminated area and at least one uncontaminated area separated by a plugging sheet without any break in the confinement of the contaminated area, the plugging sheet having at least one opening in front of which is fixed the filter from the side of the uncontaminated area, said filter being guided into position over the opening by a supporting frame and sealingly applied thereto, the supporting frame being itself sealingly fixed to the plugging sheet around the opening from the side of the uncontaminated area, wherein the process comprises the following stages: the filter is surrounded by a tightly sealed bag made from a flexible material as from the uncontaminated area and this bag is sealingly fixed to the outer periphery of the supporting frame, the filter is removed from the supporting frame and placed on the bottom of the tightly sealed bag, the bag is welded at two points and cut between the two welds so as to obtain on the one hand a hermetically sealed bag containing the filter and on the other a tight diaphragm separating the contaminated and uncontaminated areas of the vessel, the filter is then removed from the vessel as from the uncontaminated area and a supplementary supporting frame is sealingly fixed to the supporting frame, a replacement filter is fitted from the uncontaminated area of the vessel and being sealingly applied to the supplementary supporting frame which will serve the same function as the first-mentioned supporting frame during the next replacement and the tight diaphragm is removed from the contaminated area of the vessel.

2. The process of claim 1, wherein said first-mentioned supporting frame comprises at least one base supporting frame having at least one flange making it possible to sealingly fix it to the plugging sheet from the side of the uncontaminated area of the vessel around the opening of said plugging sheet, at least one flange permitting the fixing of the supplementary supporting frame and at least one flange permitting the guidance of the filter; said supplementary supporting frame having at least one flange making it possible to sealingly fix it to the base supporting frame or to another supplementary supporting frame, at least one flange permitting the tight fixing of another supplementary supporting frame, at least one flange making it possible to guide the replacement filter and at least one flange to which the replacement filter can be tightly applied.

3. The process according to claim 2, wherein said frames are stacked upon one another and when the stack has reached a maximum height after a certain number of filter replacement operations, the stack is removed; and wherein the stack removal operation comprises the following stages: during the final replacement and with the filter removed and the tight diaphragm still in place, the stack of supporting frames is surrounded by a tight bag made from a flexible material which is sealingly fixed to the outer periphery of a removal frame, the latter being sealingly fixed to the plugging sheet from the side of the uncontaminated area of the vessel and externally of the base supporting frame, the latter is disengaged from the plugging sheet and the stack of supporting frames is placed in the bottom of the tight bag, the bag is welded at two locations and cut between the two welds so as to obtain on the one hand a hermetically sealed bag containing the stack of supporting frames and on the other a tight diaphragm separating the contaminated area and the uncontaminated area of the vessel, the latter is decontaminated, the aforementioned tight diaphragm removed and the frames are stored.

4. The process according to claim 3, wherein the removal frame has at least one flange enabling it to be sealingly fixed to the plugging sheet and at least one flange permitting the fixing of the tight bag made from flexible material used for removing the supporting frames.

5. The process according to claim 4, wherein the sealing between the removal frame and the plugging sheet is brought about by means of a silastene joint.

6. The process according to claim 2, wherein the seal between the base supporting frame and the plugging sheet, the sealing between two supplementary supporting frames or between a supplementary supporting frame and the base supporting frame are ensured by silastene joints.

* * * * *